May 19, 1953   W. G. BLEVINS, SR., ET AL   2,638,949
MUSHROOM TRIMMING MACHINE
Filed Nov. 30, 1951   12 Sheets-Sheet 1

Inventors:
Walter G. Blevins
Richard A. Coleman
John Mills
by J.P. Churchill
Att'y.

Inventors: Walter G. Blevins
Richard A. Coleman
John Mills by M. Churchill
Att'y.

Inventors:
Walter G. Blevins
Richard A. Coleman
John Mills
by M. P. Churchill
Att'y.

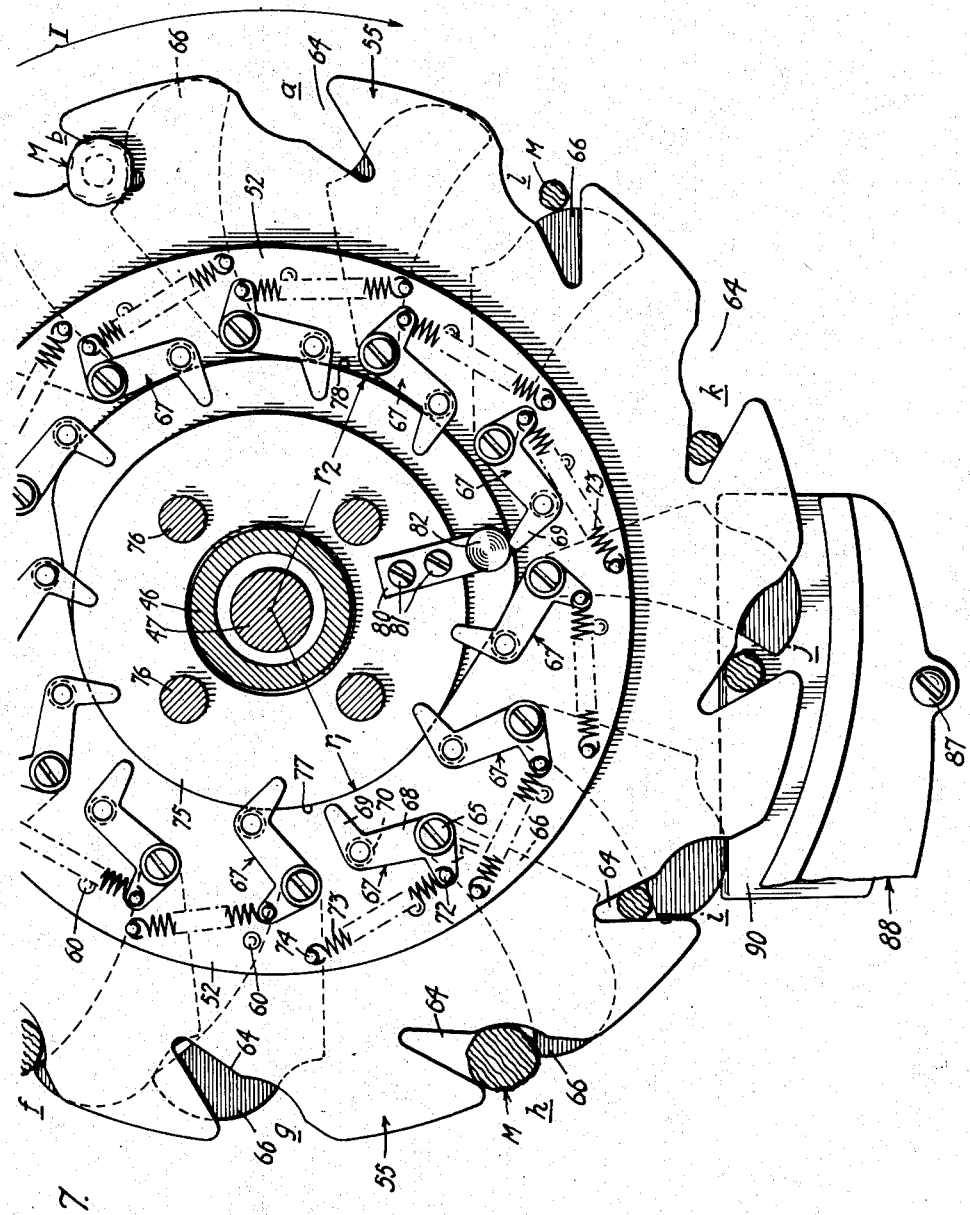

May 19, 1953  W. G. BLEVINS, SR., ET AL  2,638,949
MUSHROOM TRIMMING MACHINE
Filed Nov. 30, 1951  12 Sheets-Sheet 6
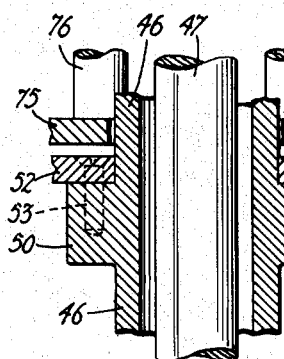
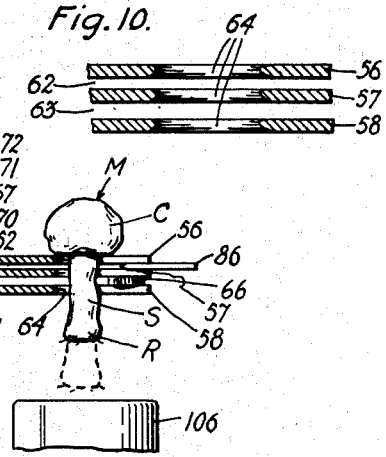
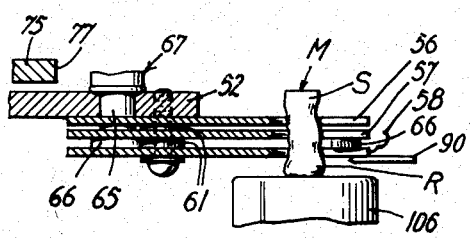
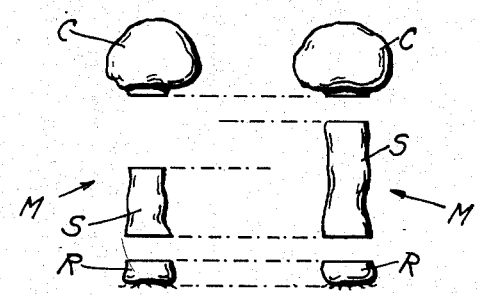
Inventors:
Walter G. Blevins
Richard A. Coleman
John Mills
by *M. P. Churchill*
Att'y.

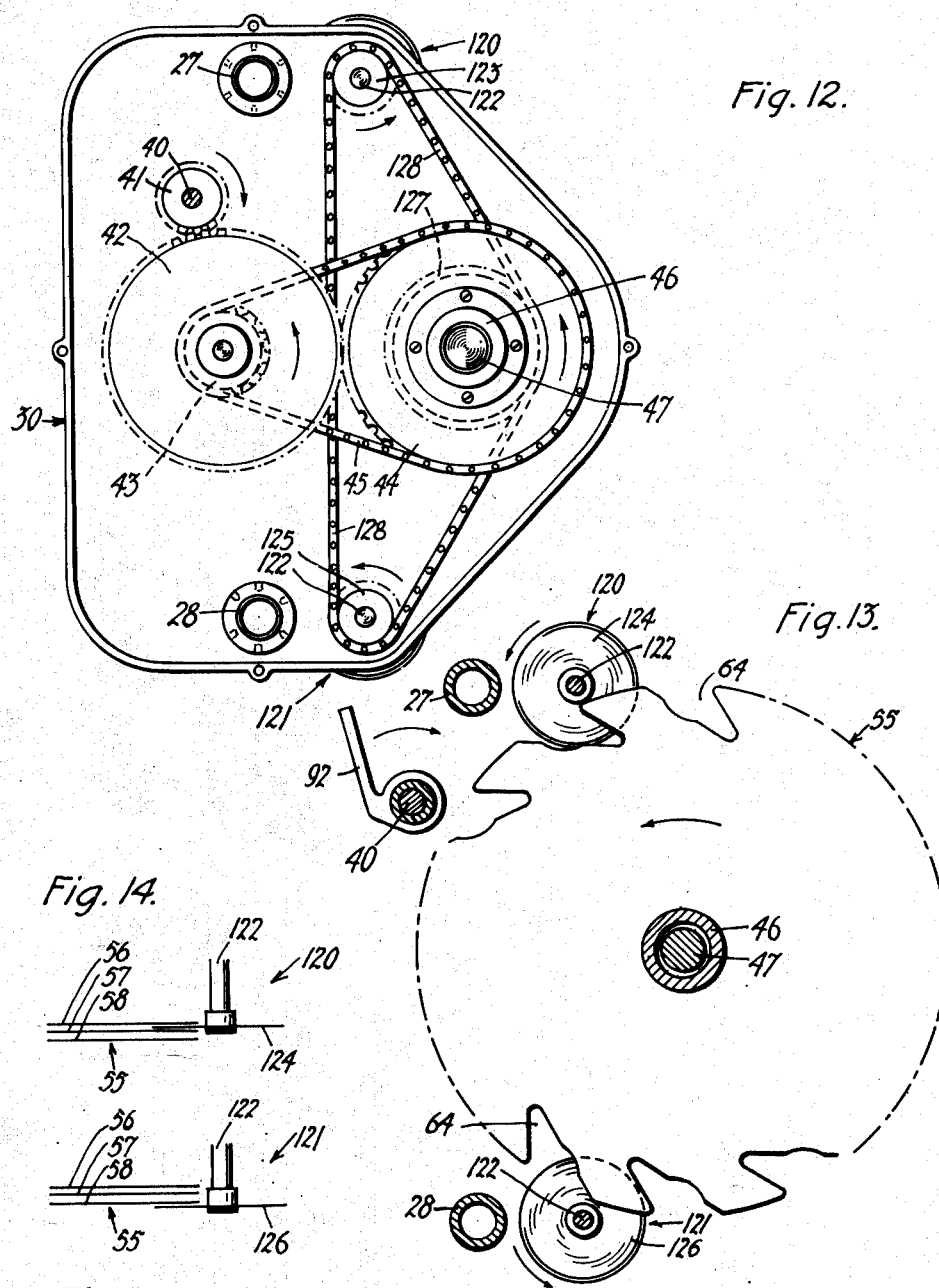

May 19, 1953   W. G. BLEVINS, SR., ET AL   2,638,949
MUSHROOM TRIMMING MACHINE
Filed Nov. 30, 1951   12 Sheets-Sheet 8

Inventors:
Walter G. Blevins
Richard A. Coleman
John Mills
by J. P. Churchill
Att'y.

May 19, 1953 W. G. BLEVINS, SR., ET AL 2,638,949
MUSHROOM TRIMMING MACHINE
Filed Nov. 30, 1951 12 Sheets-Sheet 10

Inventors:
Walter G. Blevins
Richard A. Coleman
John Mills
by M. P. Churchill
Att'y.

May 19, 1953  W. G. BLEVINS, SR., ET AL  2,638,949
MUSHROOM TRIMMING MACHINE
Filed Nov. 30, 1951                    12 Sheets-Sheet 11

Inventors:
Walter G. Blevins
Richard A. Coleman
John Mills
by  J.P. Churchill
                    Att'y.

Inventors: Walter G. Blevins
Richard A. Coleman
John Mills

Patented May 19, 1953

2,638,949

UNITED STATES PATENT OFFICE 2,638,949

MUSHROOM TRIMMING MACHINE

Walter G. Blevins, Sr., and Richard A. Coleman, West Chester, and John Mills, Drexel Hill, Pa., assignors to Brandywine Mushroom Corporation, West Chester, Pa., a corporation of Delaware Application November 30, 1951, Serial No. 259,212

6 Claims. (Cl. 146—81)

This invention relates to a machine for trimming or cutting off selected end portions of plants, and in one of its more specific aspects to a machine for severing the caps and roots from the stems of mushrooms.

A primary object of the invention is to minimize or substantially eliminate waste in trimming mushrooms or the like.

Another object of the invention is to provide an improved machine that is adapted to readily and expeditiously trim mushrooms or the like, without damaging the parts thereof.

Another object of the invention is to remove a predetermined amount of mushroom root ends regardless of the sizes of the mushrooms.

Another object of the invention is to provide a mushroom trimming machine so constructed and arranged that the moving parts thereof are guarded against clogging or undue wear due to the presence of dirt or other foreign particles in the course of operation, and the operator is protected against injury.

The invention has for a further object the provision of a machine of the character indicated that is capable of performing its intended functions in an efficient and trouble free manner.

A still further object of the invention is to provide a mushroom trimming machine that is relatively simple, sturdy and compact in construction, and that is reasonable in manufacturing and maintenance costs.

To the end that the foregoing objects may be attained, a preferred form of mushroom trimming machine constructed in accordance with this invention comprises a support that carries a vertical rotary shaft and a driving means, preferably including an electric motor and suitable gearing for imparting rotation to the shaft. Secured to and rotatable with the shaft is a wheel having a plurality of substantially circular discs that are coaxial with the shaft and that consist of a top disc, a bottom disc, and a third disc intermediate and spaced from the top and bottom discs. Each of these discs has a plurality of equiangularly spaced peripheral openings. The peripheral openings of each disc are preferably the same in configuration and are aligned with corresponding openings in the other discs, whereby a mushroom may be inserted in each set of aligned openings and arranged with its cap bearing against the upper surface of the top disc and its root part projecting beyond the lower surface of the bottom disc.

The machine has resilient means for releasably engaging each mushroom carried by the discs, whereby to maintain the same in its aligned disc openings during a portion of each complete revolution of the wheel. The resilient means may include a plurality of pivotally mounted, spring-biased clamps that are positioned in the space between the intermediate and bottom discs and that are adapted to engage corresponding mushroom stems. Suitable camming means control the position of each spring-biased clamp during each revolution of the wheel.

Alternatively, the resilient means may comprise a single endless spring, in the nature of a garter belt, which is positioned in part between the intermediate and bottom discs and engages each mushroom stem during a portion of each complete revolution of the wheel. The tension or loading supplied by the endless spring may be readily adjusted by a simple control device that will be described in detail further along herein.

The cap and a minor stem portion of each mushroom, placed on the discs, are severed from the remainder of the mushroom by a first cutting means which includes a knife blade that extends into the space between the top and intermediate discs during a first increment of the above mentioned portion of each complete revolution of the wheel.

The machine also comprises a positioning or elevating means that is responsive to rotation of the shaft for moving the remainder of each mushroom upwardly with respect to the discs, whereby the root part thereof projects a selected distance below the lower surface of the bottom disc during a second increment of the mentioned portion of each complete revolution of the wheel. The elevating means may include a plurality of vertically reciprocable plungers, radially and angularly spaced with respect to the axis of the shaft and rotatable in unison therewith, and camming means cooperating with the plungers to effect reciprocation thereof upon rotation of the shaft. There is provided one such reciprocable plunger for and directly beneath each set of aligned openings in the discs.

In lieu of the above described elevating means, we find that a single rotary cam device, rotatable in response to rotation of the shaft, may be used advantageously with our machine. The details of construction of the rotary cam device and its relationship to other parts will be understood from the detailed description that follows taken in conjunction with the accompanying drawings.

The root part of each mushroom is severed from the remainder thereof during a third increment of the earlier mentioned portion of each complete revolution of the wheel. This is accomplished by a second cutting means that includes a knife blade which is positioned directly below the bottom disc and which has its cutting edge located in the path of travel of the mushrooms during the operation of the machine. Severed roots are collected in a trough or the like. Another means effects release of the resilient means during a succeeding portion of each complete revolution of the wheel. This permits the mushroom stems to be disengaged from the wheel and drop into a trough or other type of receptacle, as desired.

Either or both of the knife blades for severing the caps and root parts may be stationary or may be rotatable in response to rotation of the shaft. In instances where rotary knife blades are preferred, it is recommended that the same be actuated by the driving means of the machine, whereby they will operate in timed relation to rotation of the wheel.

The enumerated objects, as well as other objects, together with the advantages obtainable by the use of apparatus constructed in accordance with this invention, will be readily understood by persons skilled in the art upon reference to the following detailed description taken in conjunction with the accompanying drawings that respectively describe and illustrate several preferred forms of machines embodying the invention.

In the drawings wherein like reference numerals denote corresponding parts throughout the several views:

Figure 7 is an enlarged, fragmentary view taken along line 7—7 of Figure 1;

Figure 8 is a fragmentary view in enlargement taken along line 8—8 of Figure 4, and additionally shows a complete mushroom in position for trimming;

Figure 9 is a fragmentary view in enlargement taken along line 9—9 of Figure 4, and additionally shows a partially trimmed mushroom in position;

Figure 10 is an enlarged, fragmentary view taken along line 10—10 of Figure 4;

Figure 11 illustrates severed parts of mushrooms in elevation;

Figure 1:
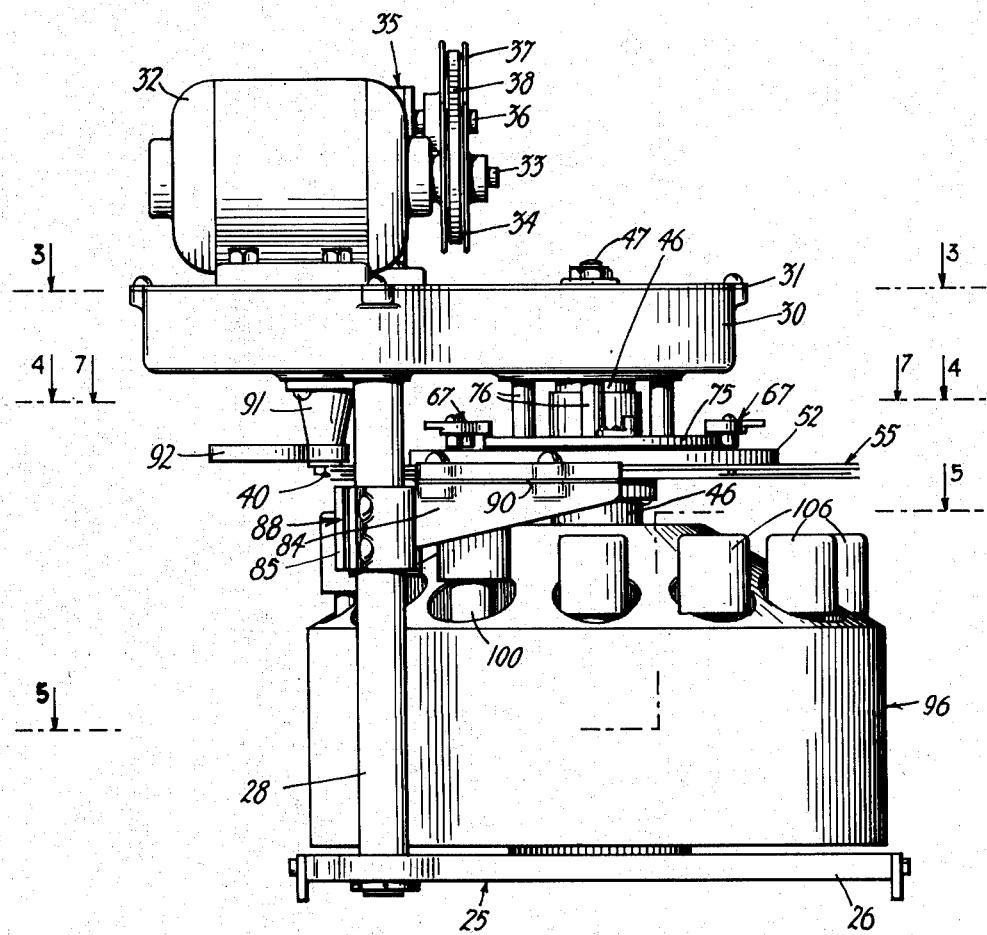
Figure 1 is a side elevation view of one form of machine embodying the invention.
Figure 2:
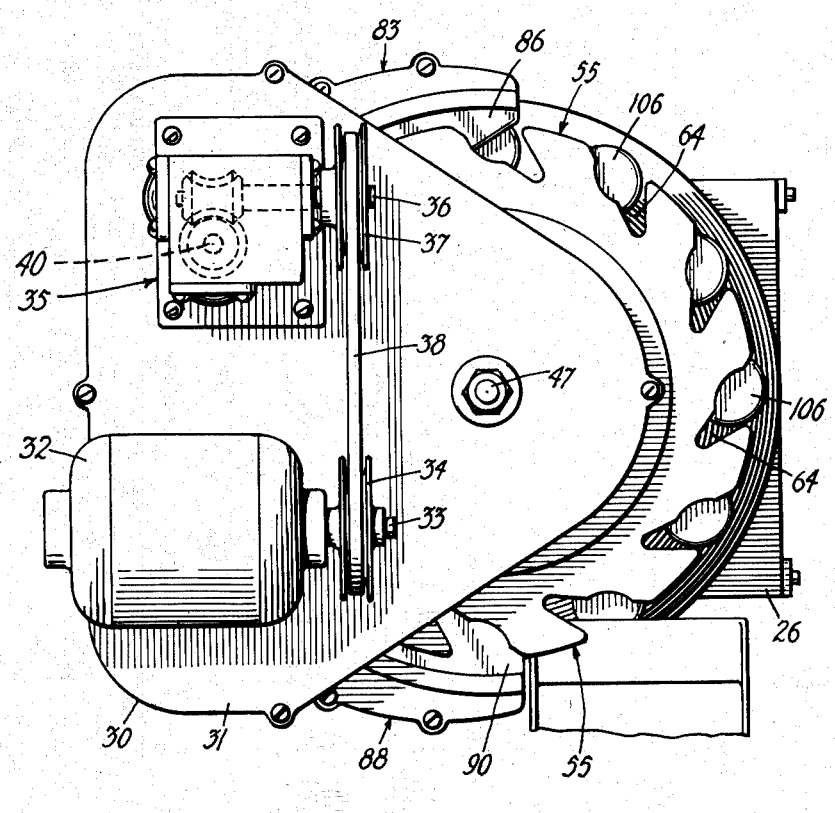
Figure 2 is a top plan view of the machine shown in Figure 1.
Figure 3:
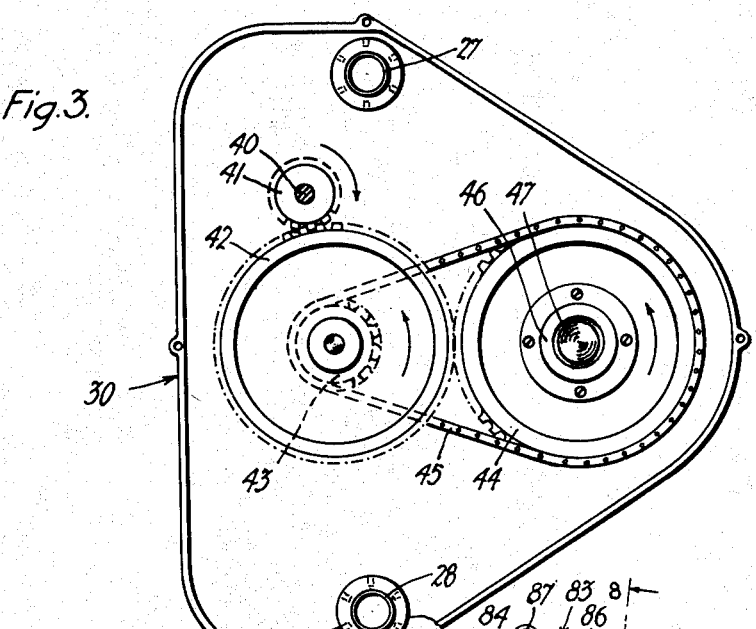
Figure 3 is a view taken along line 3—3 of Figure 1.
Figure 4:
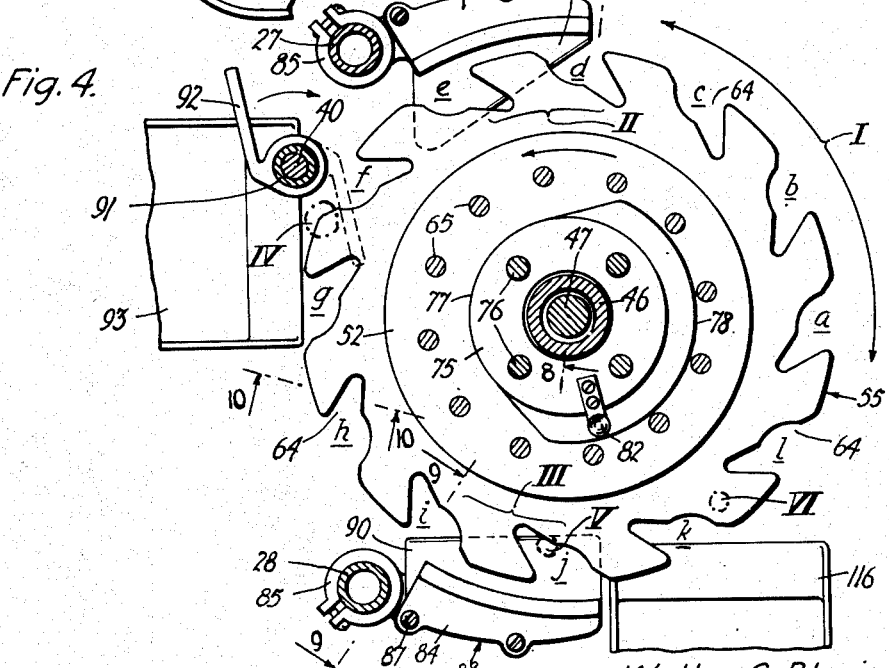
Figure 4 is a view taken along line 4—4 of Figure 1, parts being omitted.
Figure 16:
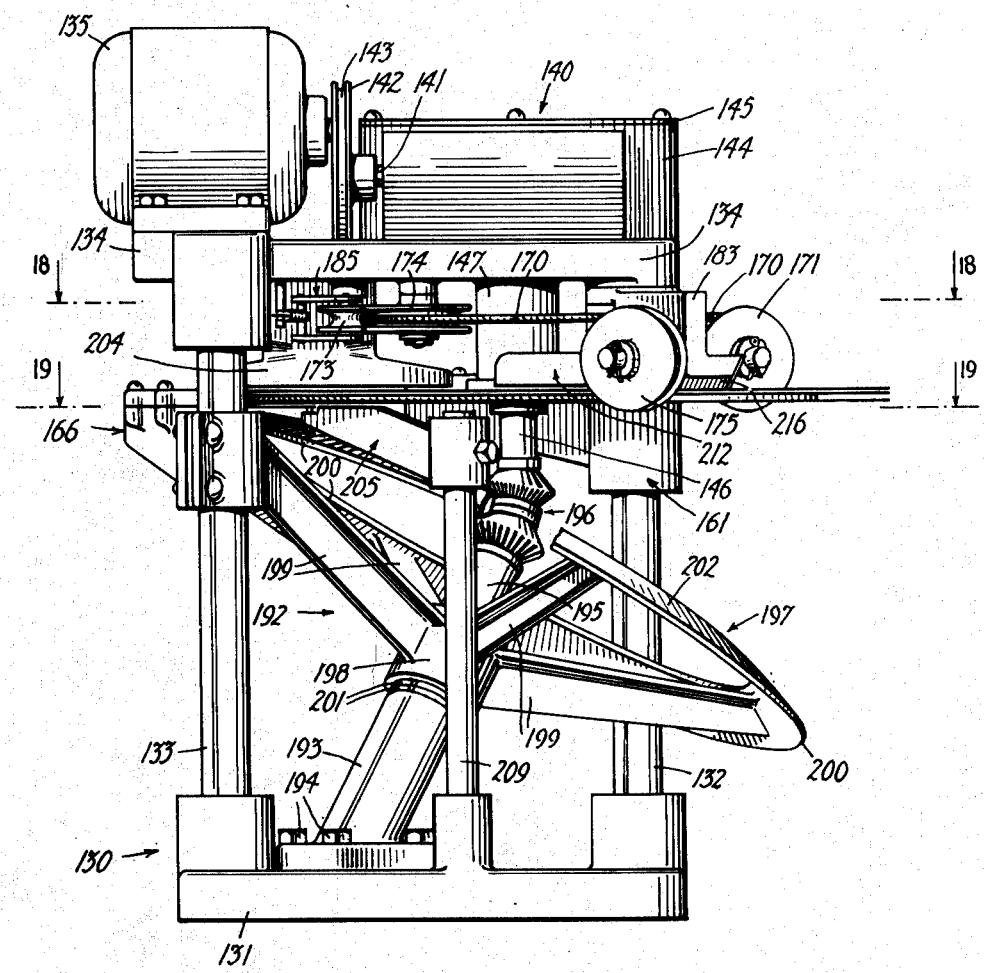
Figure 17:
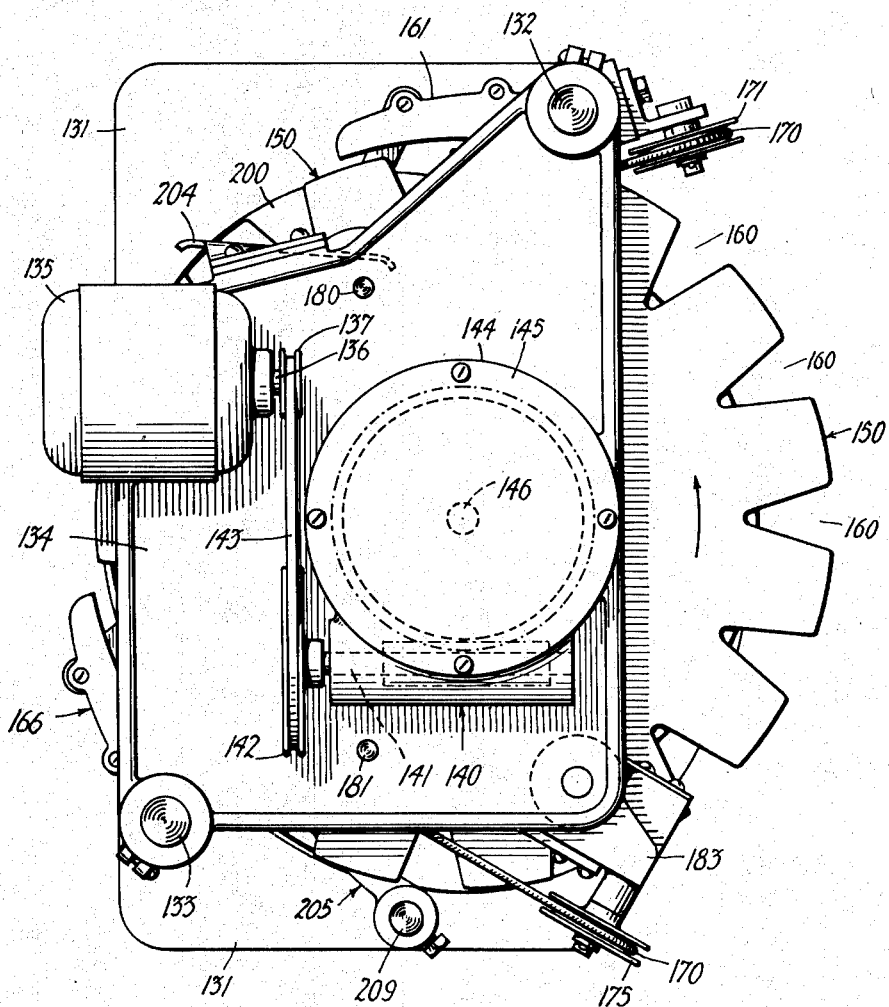
Figure 18:
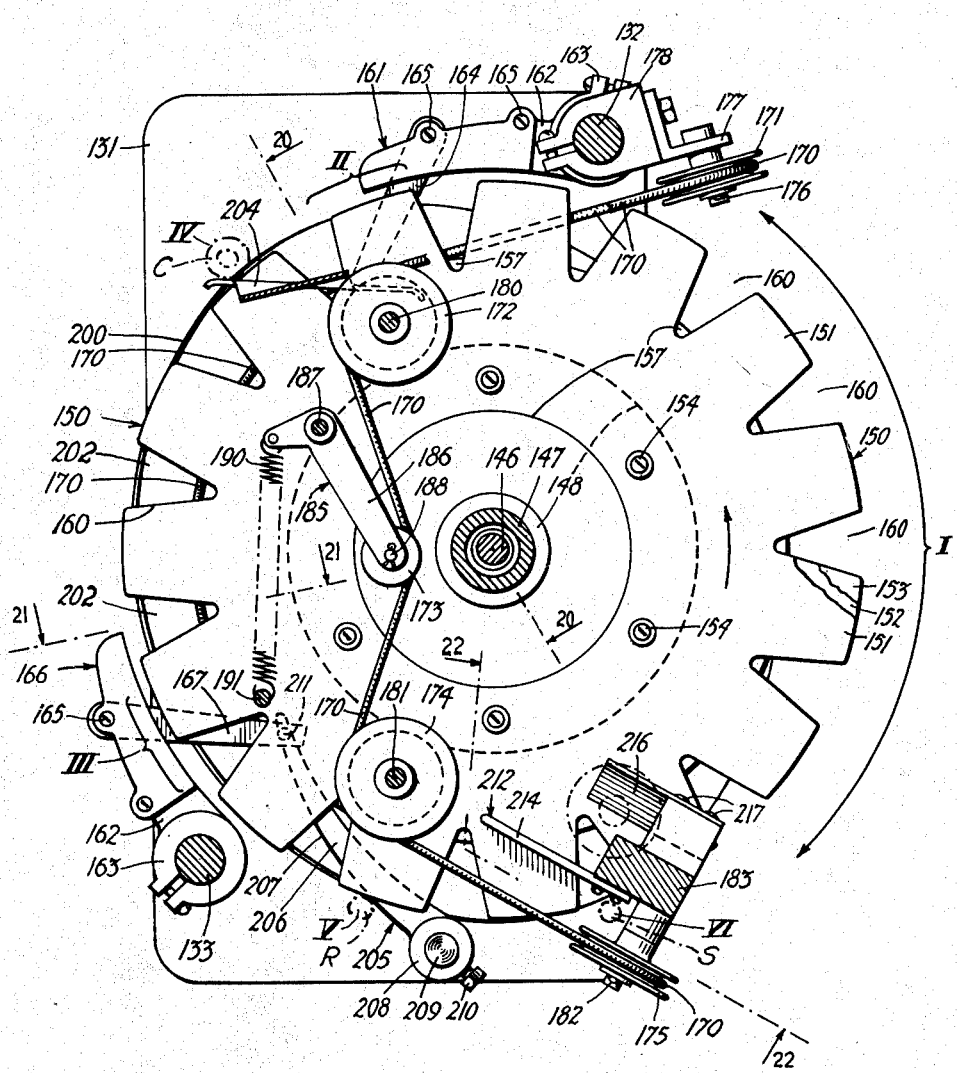
Figure 19:
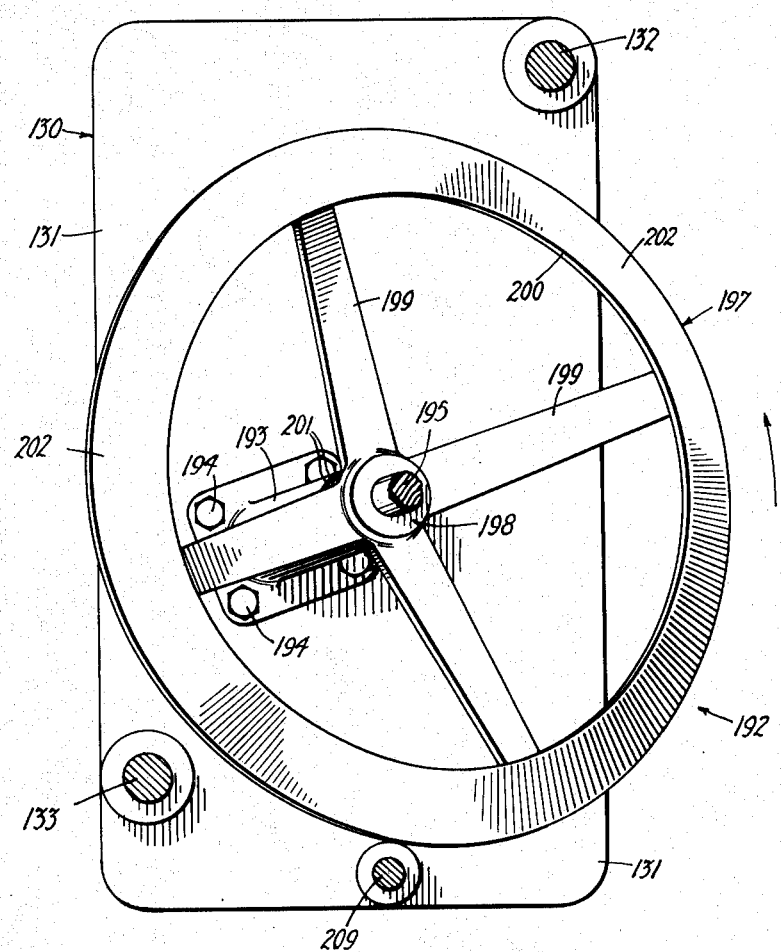
Figure 20:
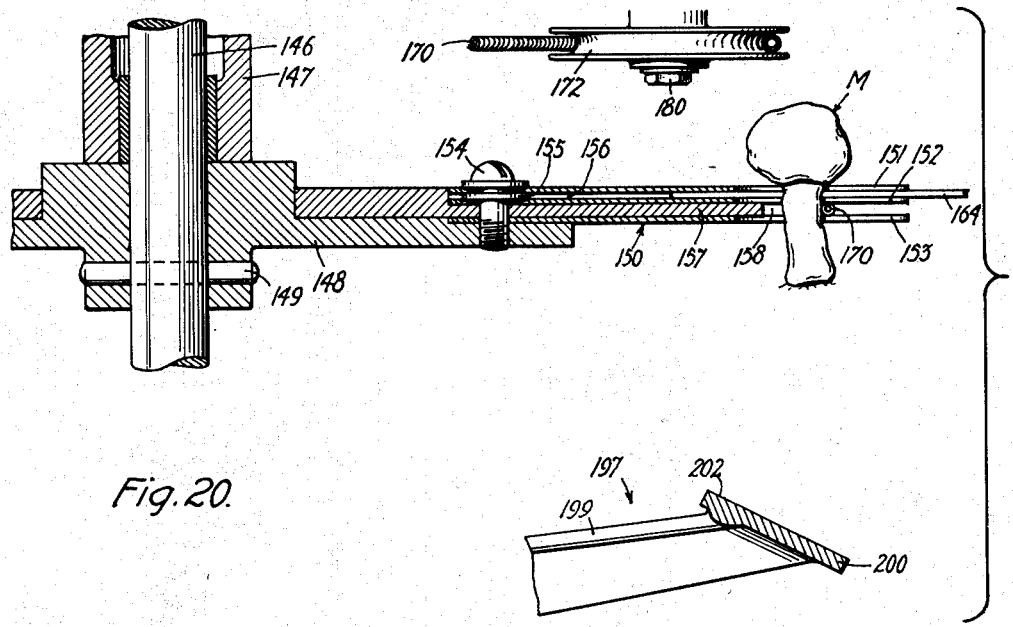
Figure 21:
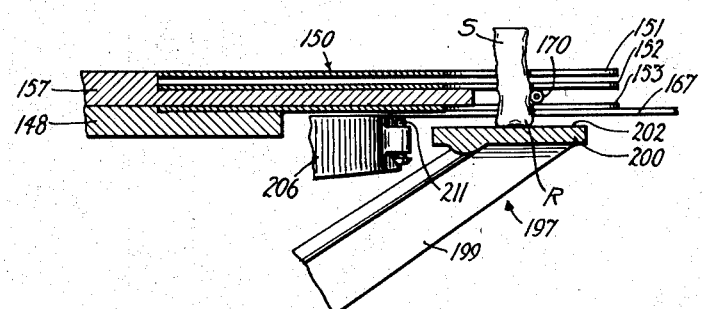
Figure 22:
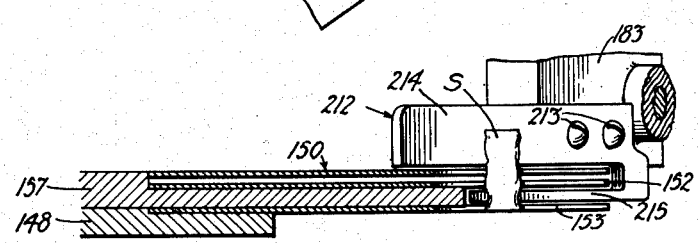

Figure 12 corresponds to Figure 3 and is illustrative of a modified form of construction;

Figure 13 corresponds to Figure 4 and shows other parts of the modified machine of Figure 12;

Figure 14 corresponds to a part of Figure 8 and illustrates a portion of one of the cutting means employed with the machine of Figure 12;

Figure 15 corresponds to a part of Figure 9 and illustrates portions of the other cutting means employed with the machine of Figure 12;

Figure 16 is a view in side elevation of another form of machine embodying the invention;

Figure 17 is a top plan view of the machine shown in Figure 16;

Figure 18 is a view taken along line 18—18 of Figure 16;

Figure 19 is a view taken along line 19—19 of Figure 16, parts being omitted for better illustration of other parts;

Figure 20 is a view in enlargement taken along line 20—20 of Figure 18, and additionally shows a mushroom in position on the wheel;

Figure 21 is an enlarged view taken along line 21—21 of Figure 18, and additionally shows a mushroom stem and root in position on the wheel; and Figure 22 is an enlarged, fragmentary view taken along staggered line 22—22 of Figure 18.

Reference is now had to Figures 1 to 11 for an understanding of the construction and operation of the machine illustrated therein. This machine comprises a support, generally indicated by numeral 25, and including a base plate 26, parallel upstanding tubular legs 27 and 28, and a gear box 30 mounted on the legs and having a removable cover 31. An electric motor 32, constituting the drive for the machine, is disposed on the gear box and has a rotary driving shaft 33 which projects beyond one end of the motor casing and carries a driving V-pulley 34.

Adjacent to motor 32 is a speed-reducing gear unit 35 that includes a rotary shaft 36 which has a V-pulley 37 at its free end. The pulleys 34 and 37 are connected by an open V-belt 38. Gear unit 35 is directly connected to a vertical shaft 40 which extends through and beneath gear box 30. Shaft 40 has a pinion 41 located within the gear box and meshing with the peripheral teeth on a gear wheel 42. Integral with gear wheel 42 is a driving sprocket wheel 43 that is connected to a driven sprocket wheel 44 through the medium of an endless chain belt 45. Secured to and rotatable with sprocket wheel 44 is a vertically disposed hollow shaft 46 that is coaxial with an inner stationary shaft 47. As is best shown in Figure 6, stationary shaft 47 has a bottom flange 48 that bears against the support base plate and is attached thereto by screws or the like 49.

Figure 6:
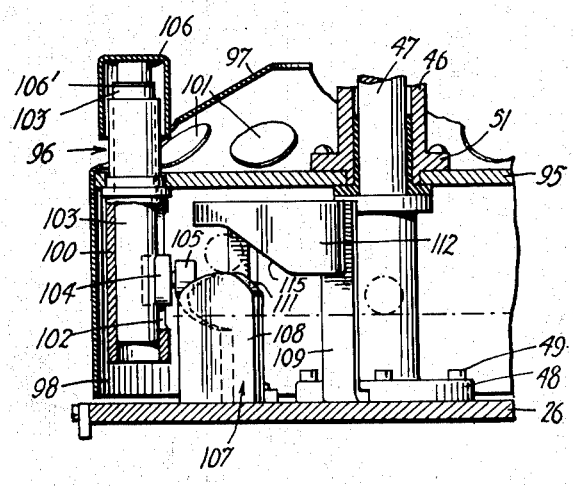
Figure 6 is a view taken along staggered line 6—6 of Figure 5.

Hollow shaft 46 is provided with an intermediate flange 50 (Figure 8) and a lower flange 51 (Figure 6). Coaxial with the hollow shaft is a plate 52 that is secured to flange 50 by a series of screws 53 (Figure 8).

Plate 52 and a disc set 55, carried thereby, constitute elements of a mushroom-carrier wheel. The disc set consists of a top disc or ring 56, an intermediate disc or ring 57 and a bottom disc or ring 58. The discs are attached to plate 52 by a plurality of screws 60 (Figures 8 and 9) and are separated by washers 61, whereby to define spaces 62 and 63. The discs are preferably circular and identical. Each disc has a like number of generally V-shaped slots or openings 64 that merge with its outer periphery. In the embodiment of the invention under consideration, twelve such slots are provided and, as will be observed from an examination of Figure 4, the slots are spaced apart equi-angularly about each disc. The slots in each disc are in vertical alignment with corresponding slots in the other discs (Figure 10).

A mushroom M is adapted to be inserted in each slot and positioned so that its cap C bears against the upper surface of the top disc 56, its stem S extends downwardly through a set of the aligned disc slots, and its root part R projects downwardly beyond the lower surface of the bottom disc 58. Each mushroom is adapted to be retained in its aligned V-shaped slots during a portion of each complete revolution of the wheel, that is, of plate 52 and disc set 55, by a corresponding resilient means that will be described next. Each resilient means comprises a vertical post 65 rotatable in plate 52 and carrying a mushroom clamp 66 at its lower end. This clamp, as shown in Figures 8 and 9, is disposed in space 63 between intermediate disc 57 and bottom disc 58. A member 67, affixed to the upper end of post 65, includes a first arm 68 that terminates in a finger 69, a depending camming lug 70, and a second arm 71. A pin 72 extends upwardly from the free end of arm 71 and is connected by a tension spring 73 to a second pin 74 that is carried by plate 52. With this arrangement, each spring 73 normally and yieldingly urges a corresponding member 67 in a clockwise direction about the axis of post 65, as viewed in Figure 7, to thereby pivot the corresponding mushroom clamp 66 in a clockwise direction relative to a corresponding set of aligned slots 64.

A stationary cam ring 75 (Figures 1, 4, 7, and 8) is supported by a plurality of posts 76 that depend from gear box 30. Cam ring 75 presents a first peripheral camming surface 77, having a radius $r_1$, and a second peripheral camming surface 78, having a radius $r_2$, and merging with camming surface 77 (Figure 7). These merging camming surfaces engage camming lugs 70 and control the angular position of corresponding mushroom clamps 66 during each complete revolution of the mushroom-carrier wheel, as will be apparent from an examination of Figures 7 and 8.

An arm 80 is mounted on cam ring 75 by a pair of screws 81 and has a pin 82 that is positioned in the path of travel of fingers 69. Thus, fingers 69 will be successively engaged and cammed by pin 82 to thereby swing corresponding members 67 and clamps 66 in a counter-clockwise direction about post 65, as viewed in Figure 7, during each complete revolution of shaft 46.

The cap and a minor portion of the stem of each mushroom placed in the machine is adapted to be severed from the remainder of the mushroom by a first stationary cutting means 83 (Figures 4 and 8). This cutting means comprises a clamping bracket 84 having a split clamping sleeve 85 for adjustable attachment to leg 27, and a knife blade 86 that is maintained in the bracket with the aid of screws 87. Blade 86 projects into the space 62 between discs 56 and 57, as shown in Figure 8.

The machine includes a second stationary cutting means 88, mounted on support leg 28, and having a number of parts that are preferably the same as corresponding parts of cutting means 83. The knife blade of the second cutting means is designated by numeral 90 and is located in part directly below bottom disc 58 (Figure 9). Blade 90 is adapted to sever the mushroom root part R from stem S.

Referring again to shaft 40, the same extends downwardly through gear box 30 and a bearing 91 depending therefrom (Figure 1), and carries at its lower end a bent finger 92. This finger is positioned directly above top disc 56 and is adapted to sweep the severed mushroom caps off disc 56 and into a trough or other receiving device 93 (Figure 4). The gearing in gear box 30 is such that shaft 40 and finger 92 make twelve complete revolutions for each revolution of shaft 46 and disc set 55. Inasmuch as there are twelve slots 64 in disc 56, finger 92 makes one complete revolution for each slot passing thereunder.

After each mushroom cap is severed by knife blade 86, but prior to severance of the root part of the mushroom by knife blade 90, the combined mushroom stem and root is raised or elevated with respect to disc set 55 so that only a pre-selected amount thereof will project below the lower surface of bottom disc 58 so that knife blade 90 will sever only a predetermined length of each lower extremity of mushrooms, that is, the root part. This is accomplished by an arrangement of devices that will now be described having reference particularly to Figures 1, 5, and 6. These devices include a plate 95, secured to flange 51 and rotatable with hollow shaft 46, and a hood 96 carried by plate 95 and consisting of a frusto conical top portion 97 and a cylindrical apron 98. Plate 95 is provided with a plurality of vertically disposed cylinders 100 open at each end and projecting upwardly through corresponding openings 101 in the hood top. Cylinders 100 are equi-angularly spaced about the axis of shaft 46 and correspond in number to that of the aligned sets of slots 64 in the disc set. Further, each cylinder is in vertical alignment with a corresponding set of aligned slots. Each cylinder 100 has a vertical through slot 102 and contains a reciprocable plunger 103 that has a guide block 104 in registry with slot 102. Each guide block carries a roller 105 rotatable about a horizontal axis. An inverted cup-shaped cap 106 is mounted on the upper end of each plunger 103 and may be raised or lowered with respect to its plunger by the addition or removal of shims 106' as required. The arrangement of openings 101 and caps 106 minimizes entry of dirt or other foreign particles into the interior of the hood and effectively prevents such dirt or other foreign particles from entering cylinders 100 and damaging the same and associated parts in the course of operation.

Figure 5:
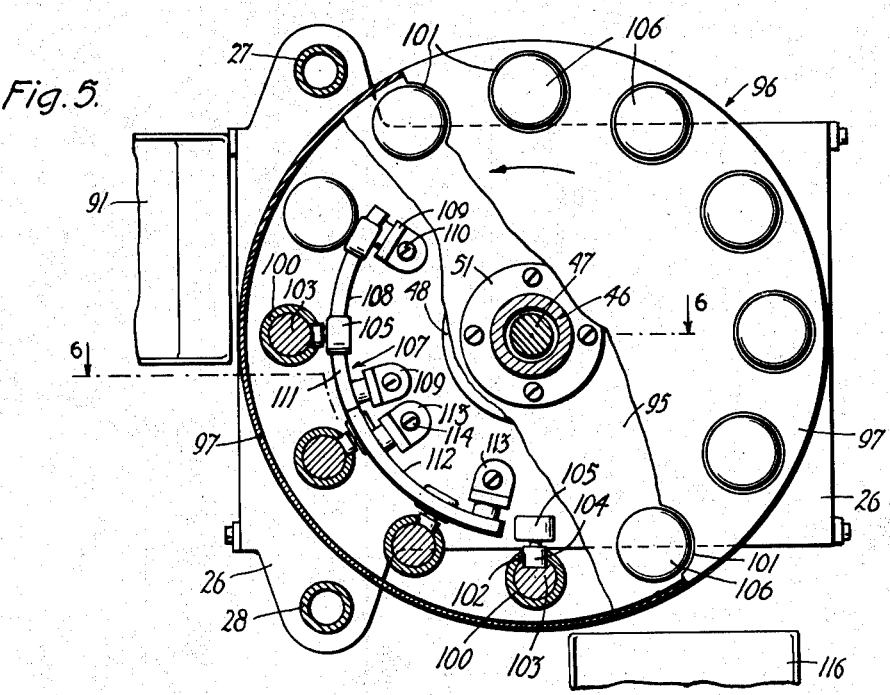
Figure 5 is a view taken along staggered line 5—5 of Figure 1.

A stationary cam means 107 cooperates with rollers 105 to control the relative position of plungers 103 in their cylinders. This cam means comprises an arcuate lower cam member 108 secured to support base 26 by brackets 109 and screws or the like 110 (Figure 5). Cam member 108 has an upper camming edge 111. The stationary cam means also comprises an upper arcuate cam secured to base 26 by brackets 113 and screws 114. Cam 112 has a lower camming edge 115.

There is provided a trough or the like 116 for receiving the trimmed mushroom stems S upon release thereof from the disc set 55.

In Figure 4, the aligned disc slots 64 are designated by lower case letters $a$ through $l$. The operator is stationed generally to the right of the machine, as viewed in Figures 1 and 4, and manually inserts mushrooms into disc slots $a$, $b$, and $c$, which, as shown, are located in the region denoted by arc I, which may be termed the "mushroom insertion station." The region designated by II may be termed the "mushroom cap-severing station." The region identified by III indicates the machine location at which the roots are severed from the stems and accordingly may be termed the "root-severing station." The severed mushroom caps are removed by finger 92 at station IV, severed root parts drop from the machine at station V and the trimmed mushroom stems fall into trough 116 at station VI.

For the purpose of outlining the operation of the above described embodiment of the invention, it is assumed that motor 32 is in service and cooperates with speed-reducing gear unit 35, and the devices within gear box 30 to impart counterclockwise rotation to hollow shaft 46, as viewed in Figures 4 and 7, and, therefore, to disc set 55, plate 95 and parts carried thereby. The operator inserts complete mushrooms M in the disc slots as they pass mushroom insertion station I (Figure 4). The mushrooms are placed in the slots so that their caps C bear against the upper surface of top disc 56 (Figure 8), their stems S register with the aligned disc slots and their roots R project downwardly below the lower surface of bottom disc 58.

Cam disc 75 coacts with the mushroom-clamping means of slots *a*, *b*, and *c* to maintain the same out of registry therewith at the time the mushrooms are inserted in those slots. The caps of mushrooms earlier inserted in the aligned disc slots are severed from the remainders of the corresponding mushrooms by knife blade 86 at station II, these remainders being engaged by corresponding clamps 66 at that time. At station IV, finger 92 sweeps the severed mushroom caps C off the disc set, causing them to drop into trough 93. Only the remainder of each mushroom is carried by the disc set when the aligned slots thereof are positioned as indicated at *f*, *g*, *h*, and *i*. The remainder of each mushroom is raised or elevated by a corresponding plunger 103 at a point intermediate station IV and station III against the light holding action of a corresponding mushroom clamp.

All plunger caps are adjusted so that their upper limit of travel is a preselected distance below the under surface of bottom disc 58. This determines the amount that will be severed by knife blade 90 and should be such that only the root part R of each mushroom is cut from the stem. The adjustment of plunger caps may be varied depending on the length of the root part to be severed. The clamping means retain the elevated remainder of the mushrooms in their slots until they pass beyond station III where the root part R is severed from the stem S and falls into a convenient receptacle below station V. As the mushrooms pass from station III to VI, the mushroom clamps 66 are released from the stems by the interaction of cam ring 75 and members 67 against the action of springs 68, permitting the trimmed stems S to descend by gravity into trough 116.

The modification shown in Figures 12 to 15, inclusive, contemplates utilizing a first rotary cutting means 120 and a second rotary cutting means 121 in lieu of stationary cutting means 83 and 88, respectively, of the above described embodiment of the invention. The first rotary cutting means 120 comprises a vertical rotary shaft 122, supported by and extending below gear housing 30. Shaft 122 has a sprocket wheel 123 at its upper end and a disc knife 124 at its lower end. The disc knife projects into the space between the top disc 56 and intermediate disc 57, as in the case of knife blade 86, and is adapted to sever the cap and a minor portion of the stem from the remainder of each mushroom.

The second rotary cutting means 121 includes a number of parts that are the same as corresponding parts in cutting means 120. The sprocket wheel of the second cutting means is denoted by numeral 125 while its disc knife is identified by numeral 126. As in the case of knife blade 90, disc knife 126 is located directly below bottom disc 58 to sever the root part from the stem of each mushroom.

A sprocket wheel 127, positioned within the gear box 30, is coaxial with shaft 46 and is rotatable therewith. An endless chain belt 128 engages sprocket wheels 123, 125 and 127, whereby to impart rotation to shafts 122 and to disc knives 124 and 126 in response to rotation of shaft 46.

Referring now to the embodiment of the invention shown in Figures 16 to 22, inclusive, the same includes a support 130 that comprises a base 131, a pair of parallel legs 132 and 133, and a mounting plate 134 carried by the legs. An electric motor 135 is positioned on mounting plate 134 and has a rotary driving shaft 136 that carries a V-pulley 137 at its free end. Adjacent electric motor 135 is a speed-reducing gear unit 140 having a rotary shaft 141 and a V-pulley 142 affixed to the shaft. An open V-belt 143 connects pulleys 137 and 142. Unit 140 coacts with suitable gearing (not shown) in a gear box 144 having a removable cover 145 to impart rotation to a vertical shaft 146 that extends downwardly through mounting plate 134 and a bearing 147 that depends from the mounting plate.

A plate 148 is coaxial with shaft 146 and is attached thereto by a pin or the like 149 (Figure 20). This plate and a disc set 150 carried thereby (Figures 16, 18, and 20) constitute elements of a mushroom-carrier wheel. The disc set consists of a top disc or ring 151, an intermediate disc or ring 152, and a bottom disc or ring 153 that are secured to plate 148 by screws 154. Discs 151 and 152 are separated by washers 155 to define a space 156, while discs 152 and 153 are separated by a ring 157 to define a space 158. Each disc 151, 152, and 153 has a plurality of equi-angularly spaced peripheral V-slots 160. The discs are so arranged that the slots in each are in vertical alignment with corresponding slots in the others. In the illustrated embodiment, there is provided a total of fifteen sets of aligned V-slots 160.

A stationary first cutting means 161 (Figures 16, 18, and 20) is adapted to sever the cap and a minor portion of the stem from the remainder of mushrooms in the course of operation of the machine. This means comprises a bracket 162 having an integral split clamping sleeve 163 for attachment to support leg 132, and a knife blade 164 that is clamped to the bracket with the aid of screws 165. The knife blade, as best shown in Figure 18, is relatively long and narrow and projects into space 156 (Figure 20).

A second stationary cutting means 166 is adapted to sever the mushroom root part from the stem during operation of the machine. This cutting means may be similar to cutting means 161 and includes a knife 167 that is disposed directly below bottom disc 153 (Figure 21).

Mushrooms that are to be trimmed by the machine are inserted in aligned sets of slots 160 in the same manner as in the earlier described embodiment. The mushrooms, when so arranged, are adapted to be maintained in position during a predetermined portion of each complete revolution of the ring set by a resilient means that will now be described having reference particularly to Figure 18. This means comprises a single helical endless spring 170 that is in the nature of a garter belt. A portion of spring 170 is disposed in space 158 and engages the stems of the mushrooms, as shown in Figures 20 and 21. A major portion of the remainder of spring 170 is disposed above disc set 150 and is guided by pulleys 171, 172, 173, 174, and 175, in the order named and as illustrated in Figure 18. Pulley 171 is rotatable about the axis of a horizontal shaft 176 that is secured to a bracket 177 which is, in turn, attached to a split clamping sleeve 178 that is carried by support leg 132. Pulleys 172 and 174 are rotatable about the axes of parallel shafts 180 and 181, respectively, depending from mounting plate 134. Pulley 175 is rotatable about the axis of a shaft 182 that is carried by a block 183 which is pivotally secured to the under side of mounting plate 134.

Pulley 173 is an element of a device 185 (Figure 18) for controlling the tension in endless spring 170. This device includes a bell crank lever 186 pivotal about a post 187 depending from mounting plate 134. Pulley 173 is rotatable about the axis of a pin 188 at one end of bell lever 186. A spring 190, stressed in tension, is connected to the other end of the bell crank lever and to a post 191 that depends from mounting plate 134 (Figure 16). Spring 190 normally and yieldingly urges lever 186 in a counterclockwise direction about the axis of post 187, as viewed in Figure 18.

Referring next to Figures 16, 19, 20, and 21, we have illustrated therein a camming means 192 for elevating the stems of mushrooms with respect to disc set 150 subsequent to severing the mushroom caps, but prior to severing the mushroom root parts. The camming means is mounted for rotation in a bearing 193 that is inclined at an angle of approximately 60° to the horizontal and is attached to support base 131 by screws or the like 194. A shaft 195 is rotatable in bearing 193 and is connected to shaft 146 by a double universal joint unit 196. A wheel 197 for camming or elevating the mushroom parts is rotatable with shaft 195. This wheel comprises a hub 198, spokes 199 and a rim 200. One or more ring shims 201 are interposed between the top of bearing 193 and the bottom of hub 198. The number of shims employed determines the axial position of wheel 197 with respect to bearing 193 and, therefore, the relative position of wheel rim 200 with respect to bottom disc 153.

Wheel rim 200 has an upper surface 202 that is a continuous portion of the surface of revolution of a right circular cone. It will be apparent from an examination of the drawings, particularly Figure 16, that shafts 146 and 195, disc set 150 and wheel rim 200 rotate in unison. Further, the parts are so constructed and arranged that the uppermost portion of wheel rim 200, as viewed in Figure 16, is beneath bottom disc 153, and is in the region between knife blades 164 and 167 and to the left of cutting means 161, as viewed in Figure 18.

The machine is provided with a plurality of stationary devices for effecting successive removal of severed portions of mushrooms during operation. These devices include a first device 204 for deflecting severed mushroom caps off top disc 151. Device 204 is suspended from mounting plate 134 and terminates slightly above top disc 151. This device is set at an angle whereby severed caps C on coming in contact therewith will be deflected along and off disc 151, as indicated at station IV in Figure 18, for collection in a trough or the like.

A device 205 deflects severed mushroom root parts R off the disc set, as indicated at station V in Figure 18. Device 205 comprises a finger 206 that is positioned below bottom disc 153, and has an arcuate deflecting edge surface 207. A hub 208, integral with finger 206, is attached to a post 209 by a set screw 210 which permits of axial and angular adjustment of the finger with respect to the post. The inner end of finger 206 is adapted to support end of knife blade 167 by a screw 211 (Fig. 21).

A deflecting device 212 for removal of trimmed mushroom stems from the disc set after they pass out from contact with the garter belt 170, is secured to block 183 by screws 213. As shown most clearly in Fig. 22 this device comprises an upper deflecting member 214 directly above the upper surface of disc 151 and a lower deflecting member 215 which projects into space 158. Both these members will simultaneously engage both ends of the mushroom stems for removal from the slots 160 without damage to the stems, as indicated at station VI in Figure 18.

Also mounted on the block 183 is a scraper blade 216 fastened by screws 217 for final removal of dirt and mushroom particles at the end of the operating cycle. This blade is set at an angle relative to the horizontal plane of the disc set 150 and with its lower edge in light engagement with the top plate 151.

While the form of machine shown in Figures 16 to 22 contemplates the use of stationary cutting means 161 and 166 for respectively severing mushroom caps C and root parts R from the stem S, it is to be borne in mind that either, or both, of such cutting means may be replaced by rotary cutting means of the general type shown in Figures 12 to 15.

The operation of the embodiment of the invention shown in Figures 16 to 22 is in many respects the same as that of the first described embodiment and will now be briefly described having reference particularly to Figures 16 and 18. It is first assumed that motor 135 is placed in active service, thereby coacting with gear unit 140 and gears within gear box 144 to impart counterclockwise rotation (Figures 17 and 18) to shafts 146 and 195, disc set 150 and camming wheel 197.

Whole mushrooms are inserted in aligned disc slots 160, as they pass mushroom-insertion station I, and are positioned therein in the same manner outlined above in the discussion of the first described embodiment of the invention. The caps of mushrooms earlier inserted in the aligned disc slots are severed from the remainders of corresponding mushrooms by knife blade 164 at station II, such remainders being engaged by endless spring 170 at that time. At station IV, device 204 deflects the severed mushroom caps C off the disc set, causing them to drop into a trough or other receptacle (not shown). Only the remainder of each mushroom is carried by the disc set when the aligned slots thereof are in the region intermediate stations IV and III in the left portion of Figure 18. The lower extremity of each mushroom remainder is engaged by upper surface 202 of wheel rim 200, and the mushroom remainder is raised by the camming action of this wheel at a point intermediate stations IV and III against the light holding action of endless spring 170. The adjustment of camming wheel 197 determines the amount of mushroom remainder that will be severed by knife blade 167 and should be such that only the root part R of each mushroom is cut from the stem by knife 167. The severed root parts are deflected by device 205, as indicated at station V, and fall into a receptacle (not shown) conveniently located therebelow. As the mushrooms pass from station III to station VI, endless spring 170 is disengaged therefrom and finger 215 of device 212 effects removal of the trimmed stems S from the disc set, permitting the stems to descend by gravity into a trough or other form of receptacle (not shown).

From the foregoing, it is believed that the construction, operation and advantages of our present invention will be readily comprehended by persons skilled in the art. It is to be clearly understood, however, that various changes in the machines set forth above may be made without departing from the scope of the invention, it being intended that all matter contained in the description or shown in the drawings shall be interpreted as illustrative only and not in a limiting sense.

We claim:

1. In a machine for trimming mushrooms, each consisting of a cap, a stem and a root part, a support, a substantially vertical rotary shaft carried by the support, a wheel secured to and rotatable with the shaft, said wheel comprising a plurality of substantially circular discs coaxial with the shaft and including a top disc, a bottom disc and a disc intermediate and spaced from the top and bottom discs, each disc having a plurality of angularly spaced peripheral openings that are aligned with corresponding openings in the other discs for receiving a like plurality of mushrooms arranged with their caps bearing against the upper surface of the top disc and their roots projecting beyond the lower surface of the bottom disc, resilient means for releasably engaging each mushroom stem whereby to maintain the same in corresponding disc openings during a portion of each complete revolution of the wheel, first cutting means carried by the support and including a knife blade that extends into the space between the top and intermediate discs for severing the cap and a minor portion of the stem from the remainder of each mushroom during a first increment of said portion of each complete revolution of the wheel, elevating means responsive to rotation of the shaft for moving said remaidner of each mushroom upwardly with respect to the discs whereby the root part thereof projects a selected distance below the lower surface of the bottom disc during a second increment of said portion of each complete revolution of the wheel, and second cutting means carried by the support and including a knife spaced from the lower surface of the bottom disc for severing the root part of each mushroom from said remainder during a third increment of said portion of each complete revolution of the wheel.

2. The machine according to claim 1, wherein the knife blade of at least one of the cutting means is rotatable in response to rotation of the shaft.

3. The machine according to claim 1, wherein the part of the resilient means that engages each mushroom stem is positioned between the intermediate and bottom discs.

4. The machine according to claim 1, wherein the part of the resilient means that engages each mushroom stem is positioned between the intermediate and bottom discs, and the elevating means comprises a member rotatable in response to rotation of the shaft and cam means cooperatively associated with the member.

5. The machine according to claim 1, wherein the resilient means includes a plurality of spring-biased clamps positioned at least in part in the space between the intermediate and bottom discs, and the positioning means comprises a plurality of reciprocable plungers, radially and angularly spaced with respect to the axis of the shaft and rotatable in unison therewith, and means including a cam cooperating with the plungers to effect reciprocation thereof upon rotation of the shaft.

6. The machine according to claim 1, wherein the resilient means comprises an endless spring positioned at least in part between the intermediate and bottom discs, and the elevating means comprises a rotary cam device rotatable in response to rotation of the shaft.

WALTER G. BLEVINS, SR.
RICHARD A. COLEMAN.
JOHN MILLS.

References Cited in the file of this patent

UNITED STATES PATENTS

| Number | Name | Date |
|---|---|---|
| 773,664 | Moore | Nov. 1, 1904 |
| 837,445 | Wolfe | Dec. 4, 1906 |
| 1,077,230 | Pierce | Oct. 28, 1913 |
| 2,617,461 | Bach | Nov. 11, 1952 |
| 2,621,692 | Urschel et al. | Dec. 16, 1952 |